No. 652,127. Patented June 19, 1900.
W. J. MARTIN.
FURNITURE CASTER.
(Application filed Mar. 7, 1900.)

(No Model.)

Witnesses
George W. Richards
Geo. M. Copenhaver

Inventor
William J. Martin
By Davis & Davis
Attorneys

THE NORRIS PETERS CO., PHOTO-LITHO., WASHINGTON, D. C.

UNITED STATES PATENT OFFICE.

WILLIAM J. MARTIN, OF DANVILLE, PENNSYLVANIA.

FURNITURE-CASTER.

SPECIFICATION forming part of Letters Patent No. 652,127, dated June 19, 1900.

Application filed March 7, 1900. Serial No. 7,698. (No model.)

*To all whom it may concern:*

Be it known that I, WILLIAM J. MARTIN, a citizen of the United States, and a resident of Danville, county of Montour, and State of Pennsylvania, have invented certain new and useful Improvements in Furniture-Casters, of which the following is a full, clear, and exact description, reference being had to the accompanying drawings, in which—

Figure 1:
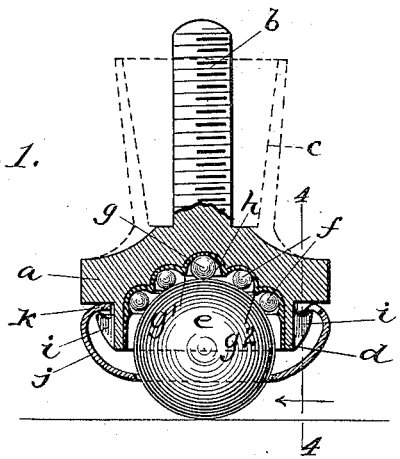
Figure 2:
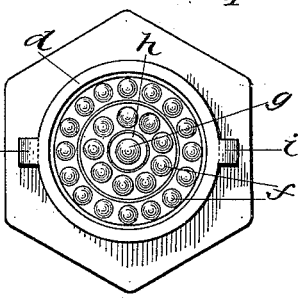
Figure 3:
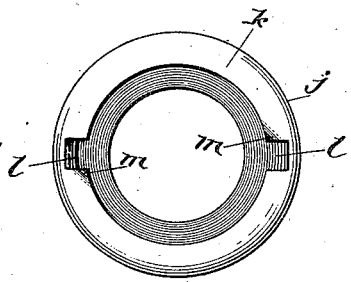
Figure 4:
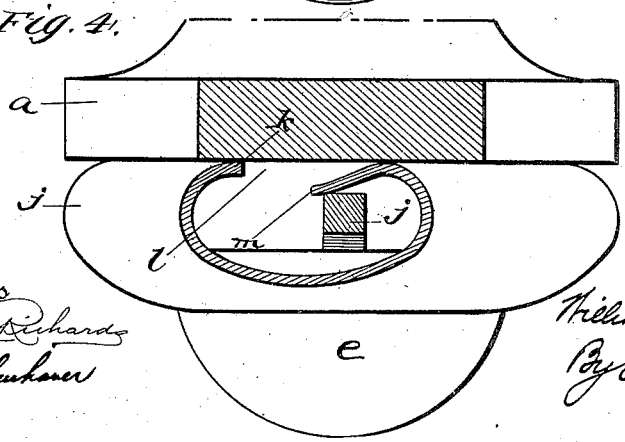

Figure 1 is a vertical sectional view of the caster complete; Fig. 2, an inverted view with the ball and confining-ring removed; Fig. 3, a plan view of the confining-ring, and Fig. 4 a vertical section on the line 4 4 of Fig. 1.

The object of the invention is to provide an antifriction-caster of simple and durable construction; and the invention consists in certain novel features of construction hereinafter described, and pointed out in the claims appended.

Referring to the drawings by letter, $a$ designates the body of the caster, which is provided with a screw $b$, as shown in full lines in Fig. 1, to enable it to be attached to the leg of the furniture, or it may be provided with any other suitable means of attachment—as, for instance, a socket, as shown at $c$ in dotted lines at Fig. 1. In the under face of the body part $a$ is formed a central depression, and projecting from the body part around the edge of this depression is an annular flange $d$, this flange and said depression in the body portion forming a cup or socket for the reception of the main or floor ball $e$. Interposed between the ball $e$ and the wall of the socket are two annular series of antifriction-balls $f$ and a central ball $g$. This latter ball rests in a central cup or recess $h$ at the apex of the socket and is held out of contact with the balls in the adjacent race by the annular downward-extending web $g'$ and the two series of balls $f$ being confined in separate ball-races formed concentrically with the central cup $h$ and one at a higher plane than the other, the balls in one race being held out of contact with the balls in the other race by the annular downward-extending web $g^2$ between the races. The lower series of balls $f$ is preferably on about the line of the under face of the caster-body, and the upper series is located half-way between said lower series and the central ball $g$.

Formed on the outer wall of the depending flange $d$ are two radial lugs $i$, arranged at diametrically-opposite points, and engaging these lugs is a ring or shell $j$, which is formed of sheet metal and is adapted to confine the ball $e$ in the socket. The upper edge of this shell is bent inward to form an annular inward-extending flange $k$, and at diametrically-opposite points this flange is provided with notches $l$, which enable the shell to be slipped on the depending flange $d$, the lugs on the flange passing through said notches and the shell being locked in place by simply rotating it to bring the notches out of alinement with lugs $i$ and flange $k$, lying between the upper ends of the lugs and the lower face of the caster-body. To positively lock the shell in position between the lugs and the caster-body, the diagonally-opposite corners of the notches $j$ are bent downward to form cam-lips $m$, which when the shell is rotated half a revolution bind against the upper ends of the lugs and clamp the shell between the lugs and the under face of the caster-body. By thus forming these cam-lips at the diagonally-opposite corners of the notches it will be observed that they form stops that prevent the shell from being rotated in the wrong direction when it is put on, and, further, that the shell requires to be rotated a complete half-revolution before the cams wedge against the lugs, so that even should the jarring of the furniture loosen the shell it will not be in danger of dropping off the lugs, since it must make a complete half-turn before the notches can come into register with the lugs.

It will be observed that the arrangement of the antifriction-balls is such that the greater part of the dead-weight of the article of furniture is taken up by the central ball $g$, which is preferably larger than the other balls, and that the two annular series of balls take up and minimize the side thrusts in all directions, and by enabling the article of furniture to which the caster is applied to be shifted about in all directions with great ease.

As will be observed in Fig. 1, I fasten in the socket a lining $n$, of sheet-steel, which is pressed into shape separately and fitted into the socket. This lining enables the caster-body to be made in the usual way of soft metal and at the same time renders the caster very durable.

What I claim, and desire to secure by Letters Patent, is—

1. In combination, a caster-body and means for fastening it to an article of furniture, said caster-body being provided with a socket and a flange depending from the edge of said socket, said flange being provided with radial lugs terminating below the lower face of the caster-body, a supporting-ball resting in said socket, a confining-shell embracing the ball and said flange and having its upper edge bent inward to form an annular flange, this flange being notched for the passage of said lugs, and means whereby the rotation of said inward-extending annular flange between the upper ends of the lugs and the lower face of the caster-body will clamp the shell between the lugs and the caster-body and lock it, substantially as set forth.

2. A caster-body and means for fastening it to an article of furniture, said caster-body being provided with a socket in its under side, said socket having a central ball-pocket $h$ and a series of concentric ball-races around said central socket, one race being in a plane above the other, an annular downward-extending web between the ball-races and a similar web surrounding the pocket $h$, to prevent the balls of one race contacting with the balls of the other and with the ball in the central pocket, a supporting or floor ball resting in said socket, a central ball between said floor-ball and the central pocket and a series of balls arranged between the ball-races and said supporting-ball, and means confining said supporting-ball in the socket.

3. In combination, a caster-body and means for fastening it to an article of furniture, said caster being provided with a socket and a flange depending from the edge of said socket, said flange being provided with radial lugs terminating below the lower face of the caster-body, a supporting-ball resting in said socket, and a confining-shell embracing the ball and having its upper edge bent inward to form an annular flange, this flange being notched at opposite points for the passage of said lugs, and cam projections on said flange adapted to engage the lugs and prevent the accidental rotation of the shell.

4. In combination, a caster-body and means for fastening it to an article of furniture, said caster being provided with a socket and a flange depending from the edge of said socket, said flange being provided with radial lugs terminating below the lower face of the caster-body, a supporting-ball resting in said socket, and a confining-shell embracing the ball and having its upper edge bent inward to form an annular flange and this flange being notched at opposite points for the passage of said lugs, and the diagonally-opposite corners of said notches being bent downward to form cam-lips $m$ which are adapted to engage the upper ends of the lugs on the flange.

In testimony whereof I hereunto affix my signature, in the presence of two witnesses, this 6th day of March, 1900.

WILLIAM J. MARTIN.

Witnesses:
 FRANK MAGILL,
 A. H. GROVE.